United States Patent [19]

Nishimura et al.

[11] Patent Number: 4,602,824
[45] Date of Patent: Jul. 29, 1986

[54] ACTUATOR OF ANTISKID SYSTEM FOR VEHICLE

[75] Inventors: Takumi Nishimura, Chiryu; Hirochika Shibata, Kariya, both of Japan

[73] Assignees: Aisin Seiki Kabushiki Kaisha, Kariya; Toyota Jidosha Kabushiki Kaisha, Toyota, both of Japan

[21] Appl. No.: 679,123

[22] Filed: Dec. 6, 1984

[30] Foreign Application Priority Data

Mar. 29, 1984 [JP] Japan ............................ 59-045588[U]

[51] Int. Cl.⁴ ............................ B60T 8/02; B60T 8/58
[52] U.S. Cl. ...................................... 303/100; 303/92; 303/116; 303/117; 303/119
[58] Field of Search ............... 303/115, 116, 119, 117, 303/114, 10–12, 61–63, 68–69, 92, 100, 101, 6 R; 188/181

[56] References Cited

U.S. PATENT DOCUMENTS

| | | | |
|---|---|---|---|
| 3,443,594 | 5/1969 | Frayer | 303/117 X |
| 3,549,212 | 12/1970 | Leiber | 303/119 |
| 3,684,328 | 8/1972 | Koivunen | 303/92 |
| 3,731,980 | 5/1973 | Fink et al. | 303/119 |
| 4,264,109 | 4/1981 | Knox et al. | 303/119 X |
| 4,269,456 | 5/1981 | Kondo et al. | 303/115 |
| 4,421,361 | 12/1983 | Arikawa et al. | 303/119 X |

Primary Examiner—Douglas C. Butler
Attorney, Agent, or Firm—Oblon, Fisher, Spivak, McClelland & Maier

[57] ABSTRACT

An actuator of an antiskid system for a vehicle and which includes a cut-off valve for selectively dividing a hydraulic pressure circuit connecting together a brake master cylinder and a wheel brake cylinder of the vehicle into a brake master cylinder-side hydraulic pressure circuit portion and a wheel brake cylinder-side hydraulic pressure circuit portion.

16 Claims, 4 Drawing Figures

ACTUATOR OF ANTISKID SYSTEM FOR VEHICLE

BACKGROUND OF THE INVENTION

1. Field of the Invention

The present invention relates to an actuator of an antiskid system for a vehicle and, more particularly, the invention pertains to an actuator of an antiskid system for a vehicle having a cut-off valve for selectively dividing a hydraulic pressure circuit connecting together a brake master cylinder and a wheel brake cylinder of the vehicle into a brake master cylinder-side hydraulic pressure circuit portion and a wheel brake cylinder-side hydraulic pressure circuit portion; an accumulator for accumulating a power hydraulic pressure; a piston moved in one direction (referred to as a "first direction", hereinafter) by the hydraulic pressure in the wheel brake cylinder-side hydraulic pressure circuit portion as well as moved in the other direction (referred to as a "second direction", hereinafter), opposite to the first direction, by the power hydraulic pressure so as to close and open the cut-off valve as well as to increase and restore the volume of the wheel brake cylinder-side hydraulic pressure circuit portion by the movement thereof in the first and second directions; and a changeover valve interposed in a power hydraulic pressure circuit connecting together the accumulator and a fluid chamber which is formed on one of the sides of the piston and to which the power hydraulic pressure is applied, the changeover valve being adapted to remove the power hydraulic pressure in the fluid chamber when a wheel of the vehicle is brought into a state close to a locked state and to apply the power hydraulic pressure to the fluid chamber when the wheel is in a state other than one close to a locked state.

2. Description of the Prior Art

In the above-described actuator, when the wheel is brought into a state close to a locked state, the power hydraulic pressure in the fluid chamber is removed. However, when the wheel is in a state other than one close to a locked state, the power hydraulic pressure is constantly applied to the fluid chamber. Although the period of time when a brake is in an operative state is extremely short as compared with the period of time for other operations of the vehicle, the power hydraulic pressure is normally applied to the fluid chamber, thus disadvantageously imposing a relatively high load on a seal member fitted to the piston. The load imposed on the seal member by the power hydraulic pressure becomes a serious problem, particularly in the case where the brake hydraulic pressure receiving area and the power hydraulic pressure receiving area on the piston are made equal to each other in order to reduce the size of the apparatus and the power hydraulic pressure accumulated in the accumulator is set such as to be higher than a maximum value of the brake hydraulic pressure at which the wheel is brought into a state close to a locked state.

SUMMARY OF THE INVENTION

In view of the above-described fact, a primary object of the present invention is to reduce the load imposed on the seal member fitted to the piston, thereby improving the durability of the seal member.

To this end, according to the invention, the above-described actuator is further provided with, a second changeover valve interposed in the power hydraulic circuit, the second changeover valve being adapted to open and close the power hydraulic pressure circuit in response to pressing and releasing of a brake pedal such that the power hydraulic pressure in the fluid chamber is removed when the power hydraulic pressure circuit is closed.

By virtue of the above-described arrangement, during the period of time when the brake pedal is in a released state and consequently it is not necessary to place the actuator in an operative state, the power hydraulic pressure circuit is closed, whereby it is possible to remove the power hydraulic pressure in the fluid chamber. Accordingly, it is possible to remarkably reduce the load on the seal member fitted to the piston which is imposed by the power hydraulic pressure, so that the durability of the seal member can be greatly improved.

BRIEF DESCRIPTION OF THE DRAWINGS

A more complete appreciation of the invention and many more of the attendant advantages thereof will be readily obtained as the same becomes better understood by reference to the following detailed description when considered in connection with the accompanying drawings, wherein.

DESCRIPTION OF THE PREFERRED EMBODIMENT

One embodiment of the present invention will be described hereinunder with reference to the accompanying drawings.

Figure 1:
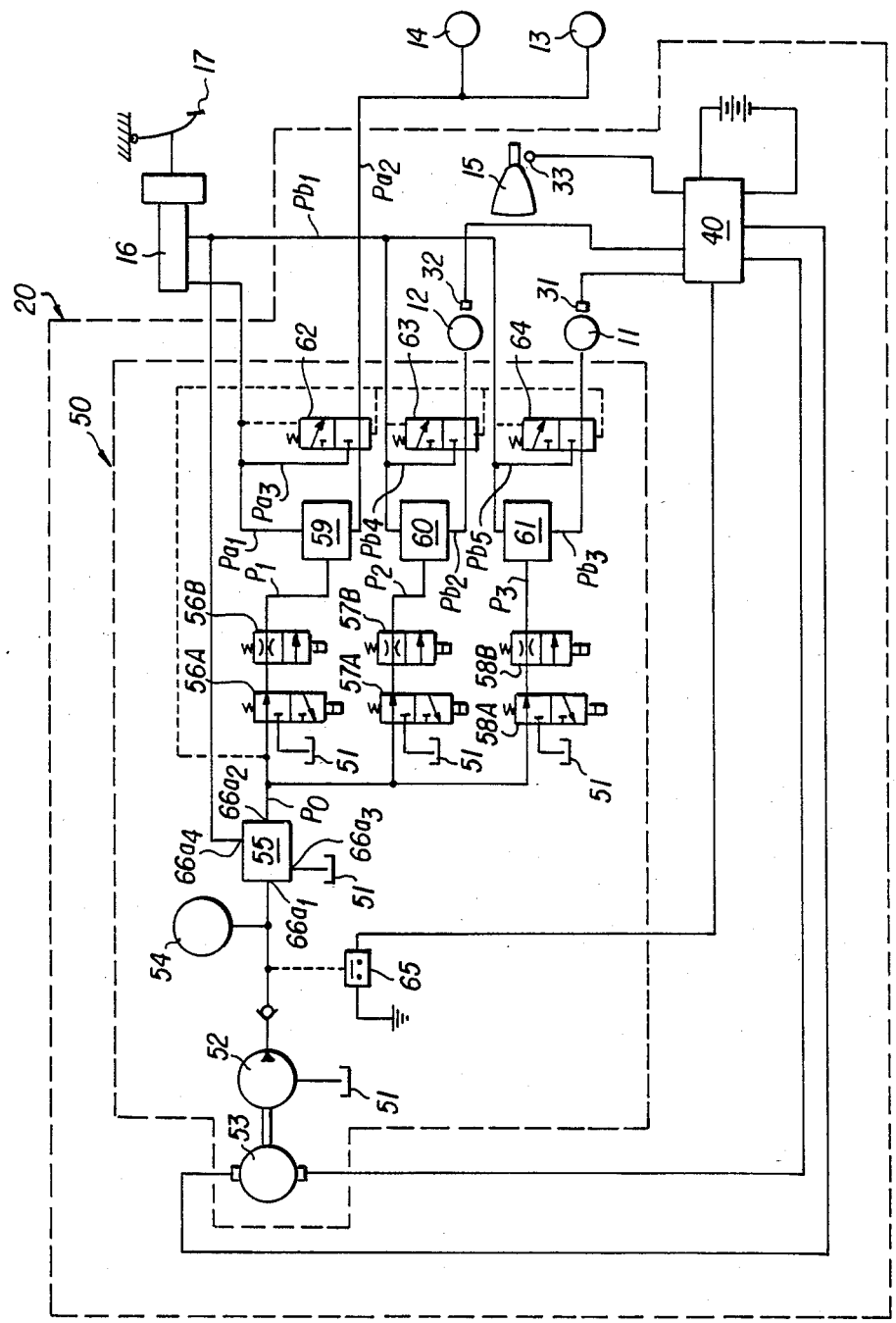
FIG. 1 is a schematic illustration of one embodiment of the actuator in accordance with the present invention.

FIG. 1 schematically shows the embodiment which is arranged such as to independently control the brake hydraulic pressure of a left-front wheel brake cylinder 11, the brake hydraulic pressure of a right-front wheel brake cylinder 12, and the brake hydraulic pressure of left- and right-rear wheel brake cylinders 13, 14. An antiskid system 20 includes a sensor 31 for detecting the number of revolutions of a left-front wheel; a sensor 32 for detecting the number of revolutions of a right-front wheel; a sensor 33 for detecting the number of revolutions of the output shaft of a speed change gear 15 as a parameter corresponding to the number of revolutions of left- and right-rear wheels; a module 40; and an actuator 50.

The actuator 50 has a reservoir 51, a high-pressure pump 52, an electric motor 53, an accumulator 54, a changeover valve 55, solenoid valves 56A, 56B, 57A, 57B, 58A, 58B, cut-off valve—piston sections 59, 60, 61, by-pass valves 62, 63, 64, and a pressure switch 65.

The reservoir 51 stores as a power hydraulic pressure medium the same brake fluid as that in a hydraulic pressure circuit extending from a brake master cylinder 16 to the wheel brake cylinders 11 to 14. The high-pressure pump 52 is actuated by the electric motor 53 to pump the power hydraulic pressure medium in the reservoir 51 to the accumulator 54. When the power hydraulic pressure in the accumulator 54 is lower than a set value, the pressure switch 65 is OFF, and a signal representing the fact that the power hydraulic pressure is lower than a set value is delivered to the module 40, which then turns to ON a circuit for driving the motor 53. When the power hydraulic pressure in the accumulator 54 is boosted to reach the set value by the operation of the high-pressure pump 52, the pressure switch 65 is turned ON. The module 40 turns OFF the circuit for driving the motor 53 when the motor 53 has been rotated for a set time after the pressure switch 65 is turned ON. Thus, in the accumulator 54 is accumulated a power hydraulic pressure within a range from a set value to a value equivalent to a power hydraulic pressure which has been boosted such as to be higher than the set value by a predetermined pressure by the operation of the high-pressure pump 52 for the above-described set time. The above-described set value is equal to a maximum brake hydraulic pressure which brings the wheels into a state close to a locked state when brakes are applied. The maximum brake hydraulic pressure is a brake hydraulic pressure which brings the wheels into a state close to a locked state under road conditions where it is most difficult for the wheels to skid.

The changeover valve 55 is interposed in a circuit P0 of the power hydraulic pressure circuit before it is branched off into power hydraulic pressure circuits P1, P2, P3 respectively allowing the cut-off valve—piston sections 59, 60, 61 to connect to the accumulator 54. When the hydraulic pressure in the brake master cylinder 16 produced by pressing of a brake pedal 17 becomes higher than a set value, the circuit P0 is opened so as to connect the power hydraulic pressure circuits P1, P2, P3 to the accumulator 54; when the hydraulic pressure in the brake master cylinder 16 becomes lower than the set value, the circuit P0 is closed so as to connect the power hydraulic pressure circuits P1, P2, P3 to the reservoir 51. The above-described set value is a relatively small value, which is set such as to be equal to a value at which the circuit P0 is infallibly opened when the brake pedal 17 is pressed in order to brake the vehicle to a stop.

The solenoid valves 56A, 57A and 58A are controlled by the module 40 such as to effect supply and discharge of the power hydraulic pressure in the accumulator 54 in relation to the cut-off valve—piston sections 59, 60 and 61, respectively. The solenoid valves 56A, 57A and 58A have the same structure which allows each solenoid valve to serve as a three-port two-position changeover valve. The solenoid valves 56A, 57A and 58A are normally held by the force of respective springs at a position for supplying the power hydraulic pressure in the accumulator 54 to the cut-off valve—piston sections 59, 60, 61, respectively. When the associated solenoid of each of the solenoid valves 56A, 57A and 58A is energized, each solenoid valve is held at a position at which the valve shuts off the corresponding cut-off valve—piston section from the accumulator 54 and allows the former to communicate with the reservoir 51.

The solenoid valves 56B, 57B and 58B are throttle valves which are respectively interposed in the power hydraulic pressure circuits P1, P2, P3 in series to the associated valves 56A, 57A, 58A. The solenoid valves 56B, 57B and 58B have the same structure. The valves 56B, 57B and 58B are normally held by the force of respective springs at a position for respectively throttling the power hydraulic pressure circuits P1, P2, P3. When the associated solenoids are energized by the module 40, the valves 56B, 57B and 58B are held at a position for respectively opening the power hydraulic pressure circuits P1, P2, P3.

The cut-off valve—piston sections 59, 60, 61 are equal to each other in structure. When the cut-off valve—piston sections 59, 60, 61 are being supplied with a power hydraulic pressure higher than a set value from the accumulator 54 through the solenoid valves 56A, 56B, 57A, 57B, 58A, 58B, the cut-off valve—piston section 59, 60, 61 allow communication between brake master cylinder-side hydraulic pressure circuit portions Pa1, Pb1 and wheel brake cylinder-side hydraulic pressure circuit portions Pa2, Pb2, Pb3 and moreover minimize the volume of the wheel brake cylinder-side hydraulic pressure circuit portions Pa2, Pb2, Pb3. Further, when the cut-off valve—piston sections 59, 60, 61 are communicated with the reservoir 51 by the operation of the solenoid valves 56A, 57A, 58A, the cut-off valve—piston sections 59, 60, 61 are actuated by the brake hydraulic pressure to cut off the wheel brake cylinder-side hydraulic pressure circuit portions Pa2, Pb2, Pb3 and the brake master cylinder-side hydraulic pressure circuit portions Pa1, Pb1 from each other and moreover increase the volume of the wheel brake cylinder-side hydraulic pressure circuit portions Pa2, Pb2, Pb3, thereby reducing the brake hydraulic pressure.

The by-pass valves 62, 63, 64 are equal to each other in structure and serve to cope with the following problem: If a required power hydraulic pressure is not produced due to, for example, a failure of the high-pressure pump 52 or the motor 53, the cut-off valve—piston sections 59, 60, 61 undesirably cut off the brake master cylinder-side hydraulic pressure circuit portions and the wheel brake cylinder-side hydraulic pressure circuit portions from each other, which makes it impossible to supply the brake hydraulic pressure from the brake master cylinder 16 to the wheel brake cylinders 11, 12, 13, 14 through the cut-off valve—piston sections 59, 60, 61. The by-pass valves 62, 63, 64 are provided in order to prevent occurrence of the above-described problem. When supplied with a power hydraulic pressure higher than a set value, the by-pass valves 62, 63, 64 respectively close by-pass passages Pa3, Pb4, Pb5. However, when the supplied power hydraulic pressure is lower than the set value, each of the by-pass valves 62, 63, 64 is actuated by the force of a spring or the combination of the spring force and the hydraulic pressure from the corresponding brake master cylinder-side hydraulic pressure circuit portion to open the associated by-pass passage, thereby ensuring the brake action.

The module 40 analyzes signals from the sensors 31, 32, 33 so as to individually detect the rotational conditions of the left-front wheel, the right-front wheel and the rear wheels. When the left-front wheel, for example, is in a state close to a locked state, the module 40 energizes the solenoid valves 58A, 58B to cause all the power hydraulic pressure being supplied to the cut-off valve—piston section 61 to be discharged into the reservoir 51. When the rotation of the left-front wheel has been satisfactorily restored by a continuous reduction of the brake hydraulic pressure in the wheel brake cylinder-side hydraulic pressure circuit portion Pb3 effected by the operation of the cut-off valve—piston section 61, the module 40 de-energizes the solenoid valve 58A so as to resume the supply of the power hydraulic pressure to the cut-off valve—piston section 61, whereby the brake hydraulic pressure in the wheel brake cylinder-side hydraulic pressure circuit portion Pb3 is boosted again by the operation of the cut-off valve—piston section 61. During this brake hydraulic pressure re-boosting process, the module 40 alternately energizes and de-energizes the solenoid valve 58B, thereby controlling the boosting rate of the brake hydraulic pressure in order to prevent the left-front wheel from being brought into a state close to a locked state again.

Figure 2:
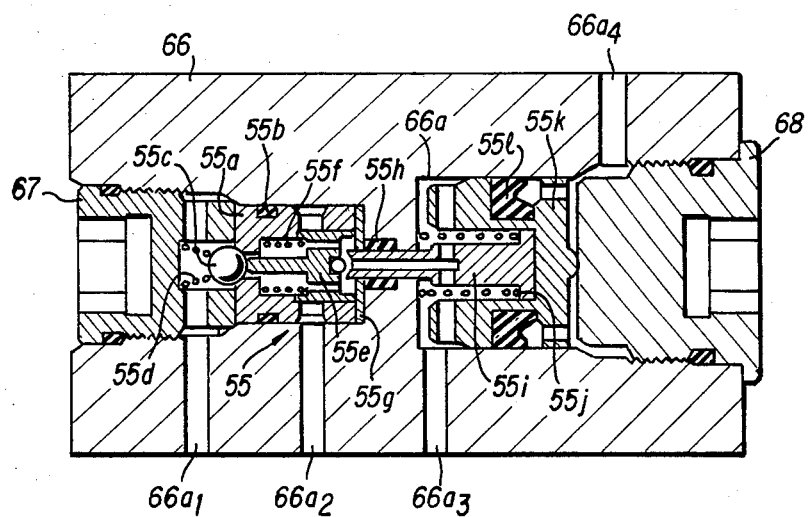
FIG. 2 is a sectional view of a changeover valve employed in the actuator shown in FIG. 1, illustrating the structure thereof in detail.
Figure 3:
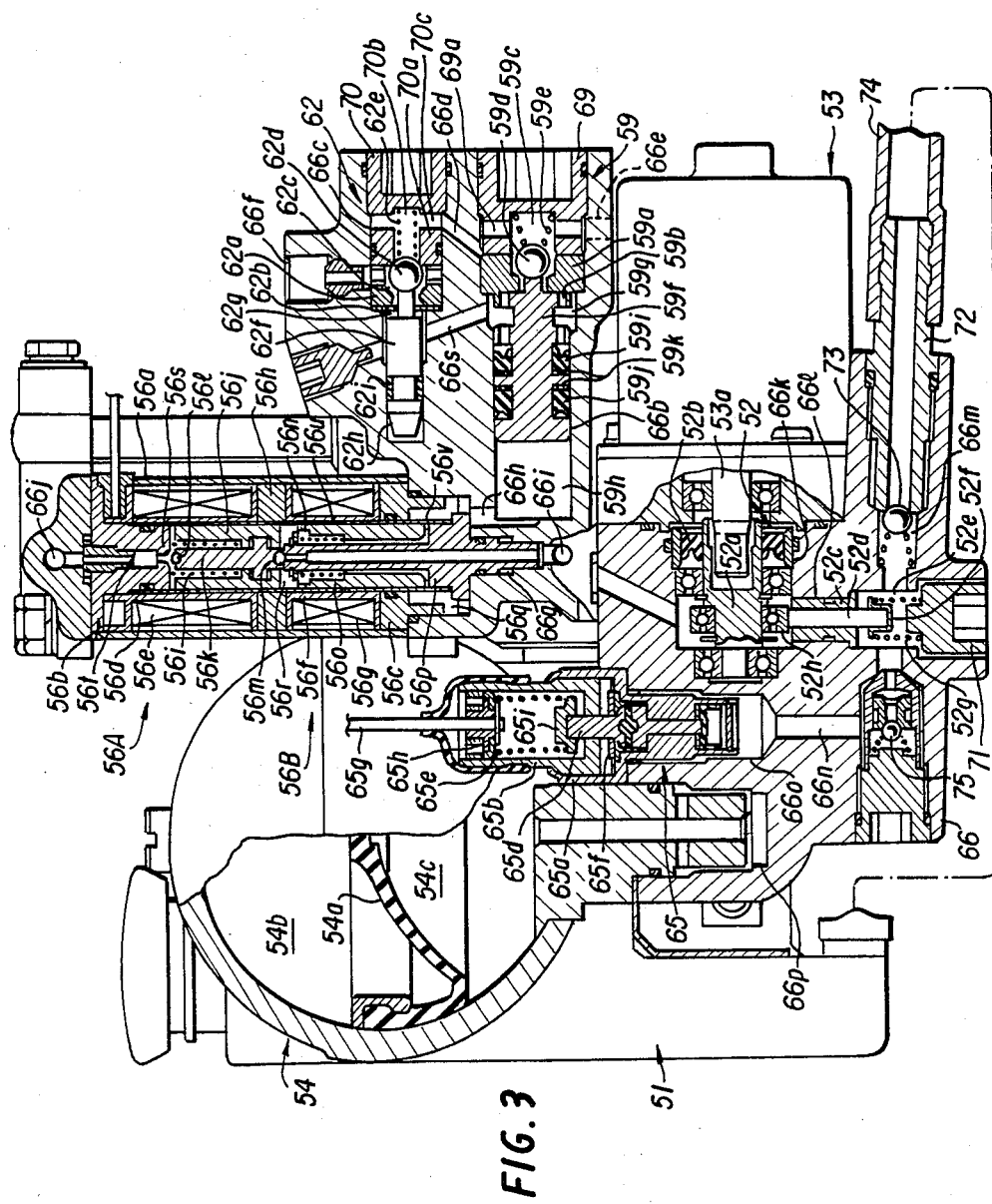
FIG. 3 is a partly-cutaway sectional view of the actuator shown in FIG. 1, illustrating in detail the structure of a high-pressure pump, an accumulator, solenoid valves, cut-off valve—piston sections, by-pass valves, a pressure switch and so forth employed in the actuator.

The following is a detailed description of the structure of the actuator 50 with reference to FIGS. 2 and 3. FIG. 2 shows the structure of the changeover valve 55 in the actuator 50, while FIG. 3 shows the structure of each of the high-pressure pump 52, the accumulator 54, the solenoid valves 56A, 56B, the cut-off valve—piston section 59, the by-pass valve 62, the pressure switch 65 and so forth in the actuator 50. It is to be noted that the structure of each of the solenoid valves 57A, 57B, 58A, 58B, the cut-off valve—piston sections 60, 61, the by-pass valves 63, 64 and so forth in the actuator 50 is not shown, since the structure of each of the above-described members will be easily understood from the detailed structure of each of the solenoid valves 56A, 56B, the cut-off valve—piston section 59, the by-pass valve 62 and so forth shown in FIG. 3 and also from the schematic illustration thereof in FIG. 1.

Referring to FIG. 2, the changeover valve 55 has a valve seat 55a, a seal member 55b, a ball-shaped valve 55c, a compression spring 55d, a valve spool 55e, a compression spring 55f, a retainer 55g, a seal member 55h, a spool 55i, a compression spring 55j a piston 55k and a ring-shaped cup sheel 55l, which are disposed within a cylinder 66a provided in a body 66 of the actuator 50. The cylinder 66a is closed at both ends thereof by plugs 67, 68. The cylinder 66a is provided with a port 66a1 communicating with the accumulator 54, a port 66a2 communicating with the solenoid valves 56A, 57A, 58A, a port 66a3 communicating with the reservoir 51, and a port 66a4 communicating with the brake master cylinder 16 (see FIG. 1). Thus, in the changeover valve 55, when a hydraulic pressure lower than a set value is applied to the port 66a4, the constituent members are at their respective positions shown in FIG. 2. More specifically, the port 66a2 is shut off from the port 66a1 by the ball-shaped valve 55c and is communicated with the port 66a3 through a radial bore provided in the valve seat 55a, an axial bore provided in the valve spool 55e and axial and radial bores provided in the spool 55i. On the other hand, when a hydraulic pressure higher than the set value is applied to the port 66a4, both the piston 55k and the spool 55i move against the compression spring 55j, whereby the axial bore in the spool 55i is closed by the ball of the valve spool 55e. Further, the valve spool 55e moves against both the compression spring 55f and the force applied to the ball-shaped valve 55c, whereby the ball-shaped valve 55c is separated from the seat portion of the valve seat 55a. Accordingly, the port 66a2 is shut off from the port 66a3 and is communicated with the port 66a1.

Referring next to FIG. 3, the cut-off valve—piston section 59 has a valve seat 59a, a seal 59b, a valve chest 59c, a ball-shaped valve 59d, a compression spring 59e, a piston 59f, a brake hydraulic pressure application chamber 59g, a power hydraulic pressure application chamber 59h, a ring-shaped cup seal 59i for the brake hydraulic pressure, a ring-shaped cup seal 59j for the power hydraulic pressure, and a backup ring 59k, which are disposed within a cylinder 66b in the body 66 which is closed at its opening by a plug 69. On the other hand, the by-pass valve 62 has a valve seat 62a, a seal 62b, a valve chest 62c, a ball-shaped valve 62d, a compression spring 62e, a piston 62f, a brake hydraulic pressure application chamber 62g, a power hydraulic pressure application chamber 62h and a seal ring 62i, which are disposed within a cylinder 66c in the body 66 which is closed at its opening by a plug 70. The inner end portion of the plug 70 serves as a valve seat portion 70a. An inner bore 70b formed in the valve seat portion 70a of the plug 70 is communicated with the valve chest 59c through a bore 66d in the body 66 and a bore 69a in the plug 69. Further, the bore 69a in the plug 69 is communicated with the brake master cylinder 16 through a port 66e. Accordingly, the hydraulic pressure supplied to the port 66e from the brake master cylinder 16 is infallibly applied to the valve chest 59c and the inner bore 70b. On the other hand, the valve chest 62c of the by-pass valve 62 is communicated with a port 66f in the body 66. The port 66f is communicated with the left- and right-rear wheel brake cylinders 13, 14 through the wheel brake cylinder-side hydraulic pressure circuit portion Pa2. Further, the brake hydraulic pressure application chamber 62g is communicated with the brake hydraulic pressure application chamber 59g through a through hole 66s. The power hydraulic pressure application chamber 62h is communicated with the power hydraulic pressure circuit between the changeover valve 55 and the solenoid valve 56A as shown in FIG. 1.

Thus, in the by-pass valve 62, as long as a power hydraulic pressure higher than a set value is applied to the power hydraulic pressure application chamber 62h, the piston 62f forces the valve 62d to be seated in the valve seat portion 70a, whereby the flow of the brake fluid from the inner bore 70b into the valve chest 62c is stopped, and the valve chest 62c is communicated with the brake hydraulic pressure application chamber 59g in the cut-off valve—piston section 59 through the brake hydraulic application chamber 62g and the through hole 66s. On the other hand, when the power hydraulic pressure applied to the power hydraulic pressure application chamber 62h becomes lower than the set value, in the cut-off valve—piston section 59, before the valve 59d is seated in the valve seat 59a by the movement of the piston 59f in the first direction (leftward) effected by the brake hydraulic pressure, the piston 62f is moved in the first direction by the force of the spring 62e or the combination of the spring force and the brake hydraulic pressure applied to the valve 62d or the piston 62f, whereby the valve 62d is separated from the valve seat portion 70a to allow the brake fluid to flow from the inner bore 70b into the the valve chest 62c and is seated in the valve seat 62a to stop a reversed flow of the brake fluid from the valve chest 62c into the brake hydraulic pressure application chamber 62g.

In the cut-off valve—piston section 59, when a power hydraulic pressure higher than a set value is applied to the power hydraulic pressure application chamber 59h, the piston 59 causes the valve 59d to separate from the valve seat 59a, thereby allowing the brake fluid to flow from the valve chest 59c into the brake hydraulic pressure application chamber 59g. Moreover, the piston 59f abuts against the valve seat 59a, thus minimizing the volume of the brake hydraulic pressure application chamber 59g. When the power hydraulic pressure application chamber 59h is communicated with the reservoir 51, the piston 59f is moved in the first direction by the brake hydraulic pressure in the brake hydraulic pressure application chamber 59g, whereby the valve 59d is seated in the valve seat 59a, thereby stopping the flow of the brake fluid from the valve chest 59c into the brake hydraulic pressure application chamber 59g as well as increasing the volume of the brake hydraulic pressure application chamber 59g in order to reduce the brake hydraulic pressure.

The solenoid valves 56A, 56B have a vertical cylindrical case 56a, a fixed core 56b also serving as an end cover fitted on the upper end of the case 56a, an end cover 56c of a magnetic material fitted on the lower end of the case 56a, a coil 56e wound on a bobbin 56d, a coil 56g wound on a bobbin 56f, a plate 56h interposed between both the bobbins 56d, 56f, a movable core 56j downwardly biased by a compression spring 56i and upwardly attracted when the coil 56e is energized, a valve support member 56k fitted and secured in the movable core 56j, ball-shaped valves 56l, 56m respectively secured to the upper and lower ends of the valve support member 56k, a movable core 56o downwardly biased by a compression spring 56n and upwardly attracted when the coil 56g is energized, and a valve seat 56p having its lower portion liquid-tightly fitted and secured into a bore 66g in the body 66. The end cover 56c is liquid-tightly screwed into a bore in the body 66 such as to define a hydraulic pressure chamber 56q. The hydraulic pressure chamber 56q is communicated with the power hydraulic pressure application chamber 59h in the cut-off valve—piston section 59 through a bore 66h.

Thus, in the solenoid valve 56A, when the coil 56B is not energized, the movable core 56j is downwardly pressed by the spring 56i, whereby the valve 56m is seated in the valve seat 56p, thus shutting off the hydraulic pressure chamber 56r defined between the movable cores 56j, 56o from a reservoir communicating passage 66i in the body 66. Moreover, the valve 56l is separated from a valve seat portion 56s of the fixed core 56b, thereby allowing the hydraulic pressure chamber 56r to communicate with a power hydraulic pressure introducing passage 66j in the body 66 through a through hole defined between the valve support member 56k and the movable core 56j and an orifice 56t provided in the fixed core 56b. On the other hand, when the coil 56e is energized, the movable core 56j is upwardly attracted. In consequence, the valve 56l is seated in the valve seat 56s, and the valve 56m is separated from the valve seat 56p, whereby the hydraulic pressure chamber 56r, is shut off from the power hydraulic pressure introducing passage 66j and is communicated with the reservoir communicating passage 66i. *In the solenoid valve 56B, when the coil 56g is not energized, the movable core 56o is downwardly pressed by the spring 56n, whereby a throttle passage 56v defined by the lower end of the movable core 56o and a bore provided in a sleeve 56u is throttled. On the other hand, when the coil 56g is energized, the movable core 56o is upwardly attracted, whereby the throttle passage 56v is opened. The throttle passage 56v is directly communicated with the hydraulic pressure chamber 56q and is further communicated with the hydraulic pressure chamber 56r through a through hole defined between the movable core 56o and the valve seat 56p.*

The high-pressure pump 52 has a cam shaft 52a born by a bearing within a cylinder 66k in the body 66; a seal member 52b for sealing the gap between the cam shaft 52a and the opening of the cylinder 66k a plunger 52d reciprocatably supported by a support member 52c within a cylinder 66l in the body 66; a compression spring 52g interposed between a plug 71 and a retainer 52f supported by the plunger 52d within a pump chamber 52e between the plug 71 and the support member 52c; and a bearing 52h mounted on an eccentric portion of the cam shaft 52a so as to engage with the plunger 52d. The cam shaft 52a is connected to a rotating shaft 53a of the DC motor 53 secured to the body 66. Rotation of the cam shaft 52a by the motor 53 causes the plunger 52d to shift into and out of the pump chamber 52e. The pump chamber 52e is communicated with a suction passage 66m in the body 66. In the passage 66m is incorporated a suction check valve 73 which employs the inner end of a union plug 72 as its valve seat. The union plug 72 is communicated with an outlet 51a in the bottom portion of the reservoir 51 through a hose 74. It is to be noted that the reservoir 51 has an inlet (not shown) communicating with the port 66a3 and the reservoir communicating passage 66i in the body 66. The pump chamber 52e is communicated with a discharge passage 66n in the body 66. A discharge check valve 75 is incorporated in the passage 66n. Thus, the pressure fluid delivered from the pump chamber 52e through the check valve 75 flows into an accumulator fitting bore 66p in the body 66 through a pressure-switch fitting bore 66o in the body 66.

The pressure switch 65 has, as its principal constituent members, a body 65a of an electric conductor liquid-tightly screwed into the pressure-switch fitting bore 66o, a body 65b of an insulator, a hydraulic pressure-sensitive plunger 65c, a movable contact member 65d connected to the plunger 65c through an insulator, and a fixed contact member 65f contacted by the movable contact member 65d as it upwardly moves against a spring 65e. A lead wire 65g is of a normally-open structure in which it is grounded to the body 66 through a retainer 65h—the spring 65e—a retainer 65i—the movable contact member 65d—the fixed contact member 65f—the body 65a. The accumulator 54 is of a gas type and has its inside partitioned by a diaphragm 54 into a gas pressure chamber 54b and a hydraulic pressure chamber 54c.

In the embodiment arranged as described above, the changeover valve 55 is interposed in the power hydraulic pressure circuit P0, and when the hydraulic pressure in the brake master cylinder 16 produced by pressing of the brake pedal 17 becomes higher than a set value, the circuit P0 is opened so as to connect the power hydraulic pressure circuits P1, P2, P3 to the accumulator 54; when the hydraulic pressure in the brake master cylinder 16 becomes lower than the set value, the circuit P0 is closed so as to connect the power hydraulic pressure circuits P1, P2, P3 to the reservoir 51. Therefore, when the brake pedal 17 is in a released state and consequently it is not necessary to place the actuator 50 in an operative state, it is possible to close the power hydraulic pressure circuit P0 and to remove the power hydraulic pressure in the power hydraulic pressure application chamber (59h) in each of the cut-off valve—piston sections 59, 60, 61 and the power hydraulic pressure in the power hydraulic pressure application chamber (62h) in each of the by-pass valves 62, 63, 64. Accordingly, it is possible to remarkably reduce the load imposed by the power hydraulic pressure on the ring-shaped cup seal (59j) for the power hydraulic pressure fitted to the piston (59f) in each of the cut-off valve—piston sections 59, 60, 61 and the seal ring (62i) fitted to the piston (62f) of each of the by-pass valves 62, 63, 64 as well as all the seal members employed in the circuit extending from the changeover valve 55 to the power hydraulic pressure application chambers (59h, 62h), so that it is possible to greatly improve the durability of the above-described seal members. Further, since the changeover valve 55 closes the power hydraulic pressure circuit P0 when the brake pedal 17 is in a released state, there is no possibility that the gas from the accumulator 54 which has undesirably entered the power hydraulic pressure circuit P0 through the diaphragm 54a may flow into the brake hydraulic pressure circuit through the power hydraulic pressure circuits P1, P2, P3.

Figure 4:
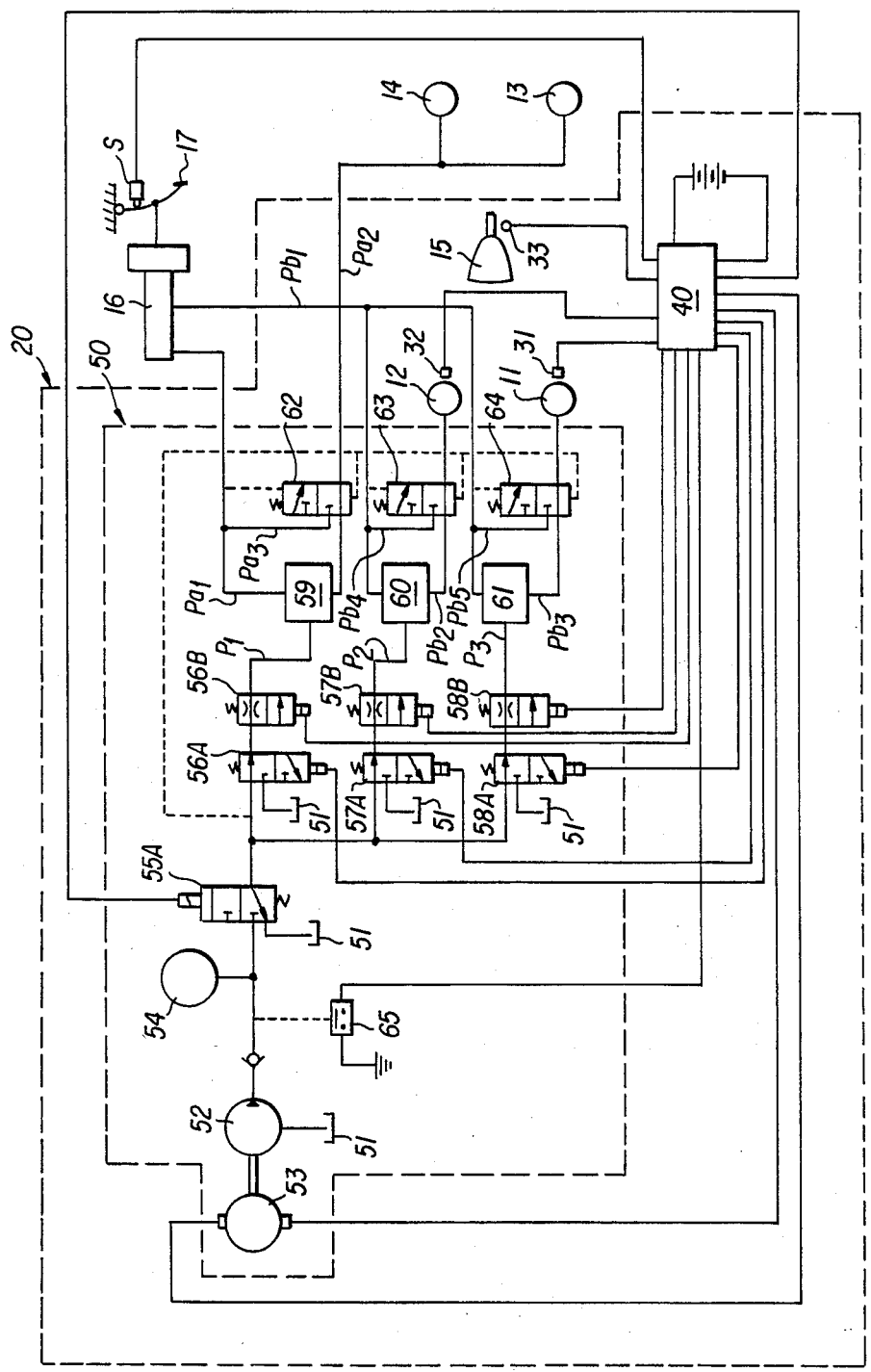
FIG. 4 is an illustration of a modification of the present invention.

It is to be noted that, although, in the above-described embodiment, the changeover valve 55 actuated by the hydraulic pressure in the brake master cylinder 16 is employed as the changeover valve which opens and closes the power hydraulic pressure circuit P0 in response to pressing and releasing of the brake pedal 17 so as to remove the power hydraulic pressure in the fluid chamber (59h), in place of the changeover valve 55, a three-port two-position electromagnetic changeover valve 55A may-be employed, as shown in FIG. 4, which is controlled by a switch S turned ON and OFF in response to pressing and releasing of the brake pedal 17. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An actuator of an antiskid system for a vehicle, comprising:
   a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;
   an accumulator for accumulating a power hydraulic pressure;
   a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;
   a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and
   a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit.

2. An actuator of an antiskid system for a vehicle according to claim 1, wherein said piston has an area for receiving said wheel brake cylinder-side hydraulic pressure and an area for receiving said power hydraulic pressure which areas are equal to each other, and the power hydraulic pressure accumulated in said accumulator is higher than a maximum value of a brake hydraulic pressure at which said wheel is brought into a state close to a locked state.

3. An actuator of an antiskid system for a vehicle according to claim 2, wherein said accumulator is of a gas type.

4. An actuator of an antiskid system for a vehicle according to claim 3, wherein said second changeover valve further comprises an electromagnetic changeover valve and switch means for controlling the operation of said changeover valve wherein said switch means is actuated in response to pressing of said brake pedal.

5. An actuator of an antiskid system for a vehicle according to claim 2, wherein said second changeover valve further comprises an electromagnetic changeover valve, the operation of which is controlled by a switch actuated in response to pressing of said brake pedal.

6. An actuator of an antiskid system for a vehicle according to claim 1, wherein said accumulator is of a gas type.

7. An actuator of an antiskid system for a vehicle according to claim 6, wherein said second changeover valve further comprises an electromagnetic changeover valve and switch means for controlling the operation of said changeover valve wherein said switch means is actuated in response to pressing of said brake pedal.

8. An actuator of an antiskid system for a vehicle according to claim 1, wherein said second changeover valve further comprises an electromagnetic changeover valve, the operation of which is controlled by a switch actuated in response to pressing of said brake pedal.

9. An actuator of an antiskid system for a vehicle, comprising:
   a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;
   an accumulator for accumulating a power hydraulic pressure;
   a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;
   a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit wherein said second changeover valve further comprises a normally-closed valve disposed in a hydraulic pressure circuit extending from said accumulator to said first changeover valve; a normally-open valve disposed in a hydraulic pressure circuit extending from said normally-closed valve to said first changeover valve; and a piston slidable against a spring by the hydraulic pressure supplied from said brake master cylinder so as to close and open said normally-open valve and said normally-closed valve, respectively.

10. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit, wherein said piston has an area for receiving said wheel brake cylinder-side hydraulic pressure and an area for receiving said power hydraulic pressure which areas are equal to each other, and the power hydraulic pressure accumulated in said accumulator is higher than a maximum value of a brake hydraulic pressure at which said wheel is brought into a state close to a locked state wherein said second changeover valve further comprises a normally-closed valve disposed in a hydraulic pressure circuit extending from said accumulator to said first changeover valve; a normally-open valve disposed in a hydraulic pressure circuit extending from said normally-closed valve to said first changeover valve; and a piston slidable against a spring by the hydraulic pressure supplied from said brake master cylinder so as to close and open said normally-open valve and said normally-closed valve, respectively.

11. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit;

wherein said accumulator is of a gas type, and said second changeover valve further comprises a normally-closed valve disposed in a hydraulic pressure circuit extending from said accumulator to said first changeover valve; a normally-open valve disposed in a hydraulic pressure circuit extending from said normally-closed valve to said first changeover valve; and a piston slidable against a spring by the hydraulic pressure supplied from said brake master cylinder so as to close and open said normally-open valve and said normally-closed valve.

12. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adpated to open and close said power hydraulic pressure circuit in response to pressing and releasing of a brake pedal such as to remove the power hydraulic pressure in said fluid chamber when closing said power hydraulic pressure circuit, wherein said piston has an area for receiving said wheel brake cylinder-side hydraulic pressure and an area for receiving said power hydraulic pressure which areas are equal to each other, and the power hydraulic pressure accumulated in said accumulator is higher than a maximum value of a brake hydraulic pressure at which said wheel is brought into a state close to a locked state, wherein said accumulator is of a gas type, and said second changeover valve further comprises a normally-closed valve disposed in a hydraulic pressure circuit extending from said accumulator to said first changeover valve; a normally-open valve disposed in a hydraulic pressure circuit extending from said normally-closed valve to said first changeover valve; and a piston slidable against a spring by the hydraulic pressure supplied from said brake master cylinder so as to close and open said normally-open valve and said normally-closed valve.

13. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit wherein said second changeover valve further comprises a normally-closed valve constituted by a fixed valve seat disposed in a hydraulic pressure circuit extending from said accumulator to said first changeover valve, and a movable valve brought into contact with said valve seat by a spring; a normally-open valve constituted by a valve spool which is disposed in a hydraulic pressure circuit extending from said normally-closed valve to said first changeover valve and is adapted to slide so as to lift said valve constituting said normally-closed valve from said valve seat, and a spool which has a passage closed by contact with said valve spool and is lifted from said valve spool by a spring; and a piston slidable against a spring by the hydraulic pressure supplied from said brake master cylinder so as to slide said spool of said normally-open valve toward said valve spool.

14. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit;

wherein said piston has an area for receiving said wheel brake cylinder-side hydraulic pressure and an area for receiving said power hydraulic pressure which areas are equal to each other, and the power hydraulic pressure accumulated in said accumulator is higher than a maximum value of a brake hydraulic pressure at which said wheel is brought into a state close to a locked state wherein said second changeover valve further comprises a normally-closed valve constituted by a fixed valve seat disposed in a hydraulic pressure circuit extending from said accumulator to said first changeover valve, and a movable valve brought into contact with said valve seat by a spring; a normally-open valve constituted by a valve spool which is disposed in a hydraulic pressure circuit extending from said normally-closed valve to said first changeover valve and is adapted to slide so as to lift said valve constituting said normally-closed valve from said valve seat, and a spool which has a passage closed by contact with said valve spool and is lifted from said valve spool by a a spring; and a piston slidable against a spring by the hydraulic pressure supplied from said brake master cylinder so as to slide said spool of said normally-open valve toward said valve spool.

15. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit, wherein said accumulator is of a gas type, and wherein said second changeover valve further comprises a normally-closed valve constituted by a fixed valve seat disposed in a hydraulic pressure circuit extending from said accumulator to said first changeover valve, and a movable valve brought into contact with said valve seat by a spring; a normally-open valve constituted by a valve spool which is disposed in a hydraulic pressure circuit extending from said normally-closed valve to said first changeover valve and is adapted to slide so as to lift said valve constituting said normally-closed valve from said valve seat, and a spool which has a passage closed by contact with said valve spool and is lifted from said valve spool by a spring; and a piston slidable against a spring by the hydraulic pressure supplied from said brake master cylinder so as to slide said spool of said normally-open valve toward said valve spool.

16. An actuator of an antiskid system for a vehicle, comprising:

a cut-off valve for selectively dividing a hydraulic pressure circuit connecting together a brake master cylinder and a wheel brake cylinder of said vehicle into a brake master cylinder-side hydraulic pressure circuit portion and a wheel brake cylinder-side hydraulic pressure circuit portion;

an accumulator for accumulating a power hydraulic pressure;

a piston movable in a first direction by the hydraulic pressure in said wheel brake cylinder-side hydraulic pressure circuit portion as well as movable in a second direction, opposite to said first direction, by said power hydraulic pressure so as to close and open said cut-off valve as well as to increase and restore the volume of said wheel brake cylinder-side hydraulic pressure circuit portion by the movement thereof in the first and second directions;

a first changeover valve interposed in a power hydraulic pressure circuit connecting together said accumulator and a fluid chamber which is formed on one of the sides of said piston and to which said power hydraulic pressure is applied, said changeover valve being adapted to remove the power hydraulic pressure in said fluid chamber when a wheel of said vehicle is brought into a state close to a locked stated and to apply the power hydraulic pressure to said fluid chamber when said wheel is in a state other than one close to a locked state; and a second changeover valve interposed in said power hydraulic pressure circuit, said second changeover valve being adapted to open and close said power hydraulic pressure circuit in response to pressing and releasing of a brake pedal such as to remove the power hydraulic pressure in said fluid chamber when closing said power hydraulic pressure circuit, wherein said piston has an area for receiving said wheel brake cylinder-side hydraulic pressure and an area for receiving said power hydraulic pressure which areas are equal to each other, and the power hydraulic pressure accumulated in said accumulator is higher than a maximum value of a brake hydraulic pressure at which said wheel is brought into a state close to a locked state, wherein said accumulator is of a gas type, and wherein said second changeover valve further comprises a normally-closed valve constituted by a fixed valve seat disposed in a hydraulic pressure circuit extending from said accumulator to said first changeover valve, and a movable valve brought into contact with said valve seat by a spring; a normally-open valve constituted by a valve spool which is disposed in a hydraulic pressure circuit extending from said normally-closed valve to said first changeover valve and is adapted to slide so as to lift said valve constituting said normally-closed valve from said valve seat, and a spool which has a passage closed by contact with said valve spool and is lifted from said valve spool by a spring; and a piston slidable against a spring by the hydraulic pressure supplied from said brake master cylinder so as to slide said spool of said normally-open valve toward said valve spool.

* * * * *